Dec. 1, 1970          A. D. EDGAR          3,544,214
ILLUMINATION INTENSITY METERING SYSTEM
Filed Nov. 9, 1967
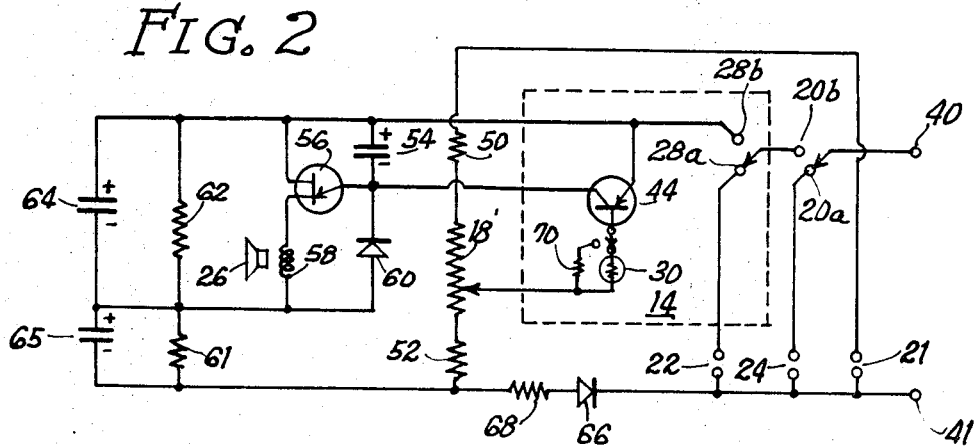
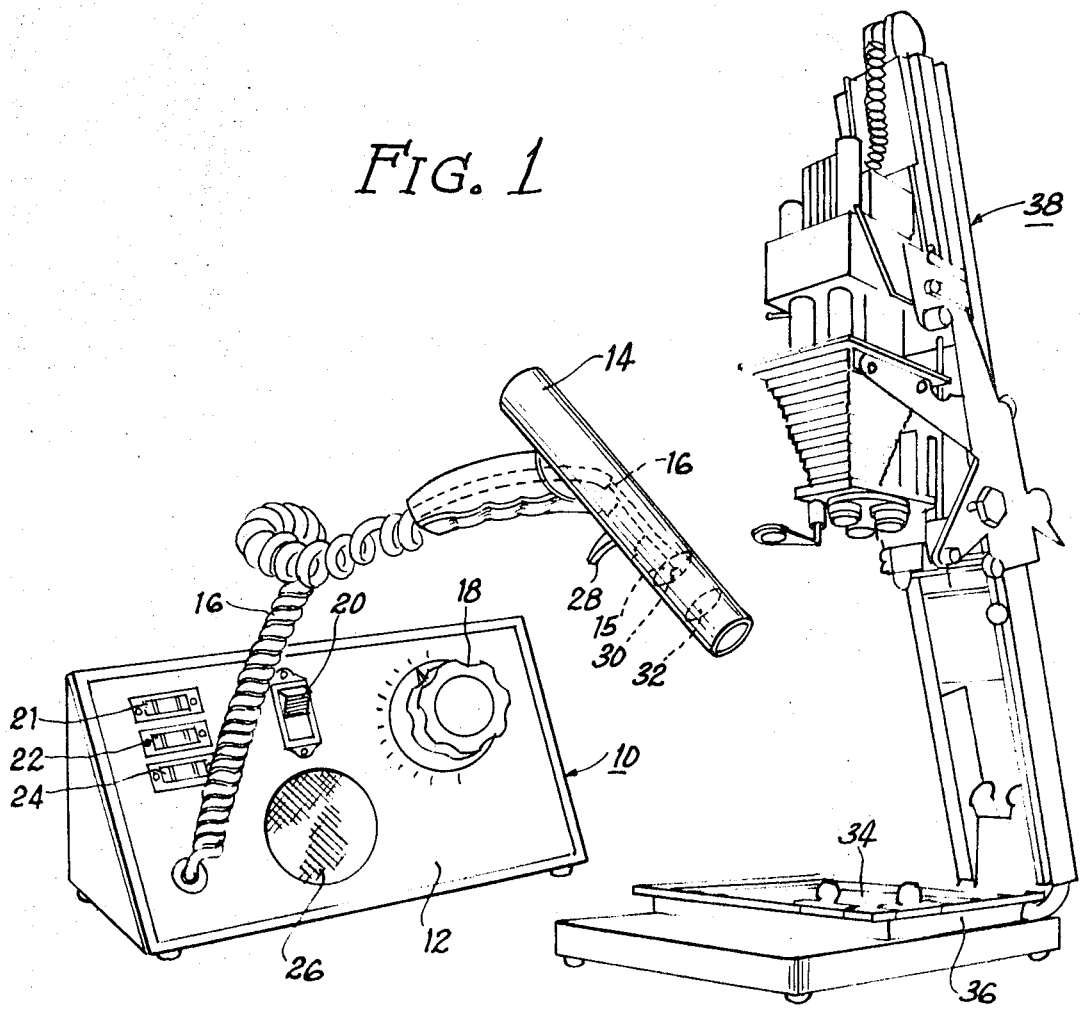
INVENTOR
Albert D. Edgar
by Dressler Goldsmith, Clement
and Gordon
Att'ys

United States Patent Office 3,544,214
Patented Dec. 1, 1970

3,544,214
ILLUMINATION INTENSITY METERING SYSTEM
Albert D. Edgar, 743 Bonnie Brae,
River Forest, Ill. 60305
Filed Nov. 9, 1967, Ser. No. 681,806
Int. Cl. G03b 27/76
U.S. Cl. 355—68
12 Claims

ABSTRACT OF THE DISCLOSURE

A system for metering visible illumination intensity which allows an operator to quantitatively determine the visible illumination intensity. A photosensitive sensing device is coupled to a speaker which emits an audible signal. The audible signal beats in proportion to the intensity of the visible light received by the photo-sensitive sensing device.

---

This invention relates to a system for metering illumination intensity. As used herein, the term "illumination" connotes the luminous flux on a selected area. Although the illustrative embodiment of the invention concerns the utilization of the system in connection with the timing of an exposure of photo-sensitive paper to light during the enlarging of a photographic negative, it is to be understood that the system of the present invention can be utilized in other applications where metering of light intensity is desired.

There are several prior art systems for metering illumination intensity, which systems are used to aid in the timing of the exposure of photo-sensitive paper to light during the process of photographic enlarging.

In one type of prior art metering system (which may be called an "equalization" system) the intensity of the exposure illumination is matched to a standard. A typical procedure using this method is as follows:

Prior to exposure of the enlarging paper to the light, a photocell is positioned on a highlight, shadow or grey area, and the enlarger lens aperture is closed until a neon lamp, responsive to the resistance of the photocell, is extinguished. A chart is then consulted for the correct exposure time depending upon the enlarger paper used, and this time is set on a timer.

The advantages of the equalization system are simplicity and economy. However, the system is disadvantageous in that where "dodging" is required, it will have to be done on a trial and error basis. Additionally, since the time is held constant, most enlargements are made at nonoptimum lens aperture openings.

Another prior art enlarger timing system displays the illumination intensity on a meter. Many methods are thereby possible. For example, a photo-sensitive device may be positioned on an area to be printed black (negative substantially transparent). The enlarger lens is then set to the desired aperture and a calibrated meter, previously set for the particular enlarging paper being used, indicates the number of seconds to which the enlarging timer should be set. A basic disadvantage of this system, as well as the equalization system, is that it requires metering before insertion of the enlarging paper and also requires the use of a separate timer.

A further prior art system provides an automatic shutoff of the enlarger lamp when the desired amount of light has reached the paper during exposure thereof. In using this system, the enlarger lens aperture is set to the desired opening, the enlarger paper is inserted, and the enlarger lamp is turned on. The metering system will turn the enlarger lamp off when a predetermined amount of light has reached the part of the enlarging paper at which the photo-sensitive device is aimed.

The last-mentioned system has various advantages. For example, a wide range of negative densities, enlarger magnifications, and lens aperture openings may be used. The region of photo-sensitivity is generally large enough to average both light and dark areas making it easy to expose for the complete subject, rather than mere highlights or shadows. There is no need for prior metering or for the use of a separate timer. Changes in illumination, such as those caused by voltage fluctuations, will induce a corrective change in time. However, disadvantages of this type of system include its relatively high cost, and the lack of indicia to make the user aware as to how fast the image is forming. Because of this lack of indicia, "dodging" cannot be accurately performed, as the exposure time is not known until after the enlarging paper has actually been exposed.

In the present invention, the named advantages of the systems discussed are combined and the named disadvantages of the prior art systems are obviated. A system is provided whereby a signal is provided in response to the intensity of illumination at the enlarging paper so that the exposure will be timed accurately and the operator will know how fast the image is forming, allowing the operator to dodge as desired, and accurately effect creative variations in the exposure. Also, the progression of exposure in different areas of the print can be followed.

In one embodiment of the present invention, a photosensitive device is positioned to receive light reflected from a selected area. Electrical current pulses are provided, the frequency of which are proportional to the intensity of the light received by the photo-sensitive device. In this manner, the illumination intensity is indicated by a signal which beats in proportion to the light intensity received by the photo-sensitive device. In one form of the invention, the signal indicating the illumination intensity is audible, whereby the operator is able to time the exposure by counting the audible pulses emitted in response to the receipt of light by the photo-sensitive device.

A more detailed explanation of the invention is provided in the following description and claims, and is illustrated from the accompanying drawings, in which:

FIG. 1 is a perspective view of a metering system according to the principles of the present invention, in use in connection with a conventional enlarger (shown not to scale); and FIG. 2 is a schematic circuit diagram of the metering apparatus illustrated in FIG. 1.

Referring to FIG. 1, the illumination metering apparatus 10 shown therein comprises a housing 12, a pistol-shaped sensing device 14 and electrical wires 16 connecting the housing 12 to the circuit 15 within the sensing device 14.

On the face of the housing 12 there is positioned a manually operable knob 18 for varying a logarithmic potentiometer, an off-on switch 20, an enlarger outlet 21, a safelight outlet 22, a room light outlet 24 and a speaker grill 26. The sensing device 14 includes an off-on switch 28, which when actuated, opens the circuit to the safelight and closes the circuit to the enlarger lamp which is connected to outlet 21.

The sensing device 14 has positioned therein a photocell 30 behind a lens 32. The photocell is utilized to pick up reflected light from a selected image region 34 within an easel 36 used in connection with a conventional enlarger 38. The selected region can be kept constant in size over a range of distances between the lens and the selected region by correct choice of lens focal length and distance between the lens and photocell. When used in this manner, the area covered is determined by the area of the lens. The lens can be replaced by mirror optics.

In the illustrated embodiment, an audible clicking sound will result when the device is in operation, and the frequency of the clicks will be proportional to the intensity of the light received by the photocell 30. The circuit for accomplishing this operation is shown in FIG. 2, in which circuit and alternating current is connected across lines 40 and 41. As shown in FIG. 2, the arm of switch 20 is engaging contact 20a so that the room light is on. When the arm is in mid position, the power is off. When the arm of switch 20 is moved from contact 20a to 20b the device will be ready for operation. Switch 28 is normally in a position whereby the safelight connected to outlet 22 is on. Movement of the arm of switch 28 caused by actuation of the trigger 28 by the operator, from contact 28a to contact 28b, will simultaneously turn off the safelight and turn on the enlarger lamp, and will place the circuit in operation.

The photocell 30 is connected between a logarithmic potentiometer 18′ and the base of a transistor 44. The current at the base of transistor 44 is controlled by the potentiometer 18′ and the resistance of the photocell 30. A resistor 50 sets the minimum voltage necessary for continuous log tracking plus the voltage bias at the base of transistor 44. A resistor 52 limits the current through the photocell 30, protecting the circuit from excessive light.

Transistor 44, the conductivity of which is controlled by the current through its base, controls the discharge rate of a capacitor 54. When the charge on the capacitor is small enough due to its being discharged through the collector-emitter circuit of transistor 44, a unijunction transistor 56 will charge the capacitor 54 through the speaker coil 58, causing the speaker to emit an audible tick. A diode 60 serves to discharge the capacitor 54 during idle periods, so each session will begin without the memory of the last.

The transient charge current comes from storage in capacitors 64 and 65. Capacitors 64 and 65 provide a storage to obtain approximately 150 volts with low ripple from a diode 66. The capacitors are separated to provide a rapid voltage rise across the unijunction circuit and to act as a damper when the capacitor 54 is charged rapidly. A resistor 68 limits the charge rate of capacitors 64 and 65 in order to protect the diode 66.

Resistor 61 reduces the voltage across the unijunction circuit. Another resistor 62 stabilizes the voltage across the unijunction circuit to reduce temperature dependence. A resistor 70 provides an optional resistance for fixed timing. In this manner, the device can be used as a standard metronome for constant exposure of a series of prints by adjusting the potentiometer 18′ to the desired rate of output signal.

As a specific example, the values of the circuit components are as follows. It is to be understood that the following values are merely given as an example, and no limitation is intended therefrom.

| Component: | Value |
| --- | --- |
| Potentiometer 18′ | 2 megohms max. (log.) |
| Photocell 30 | C1902. |
| Transistor 44 | 2N3703. |
| Resistors— | |
| 50 | 39K. |
| 52 | 150K. |
| Capacitor 54 | 1 microfarad, 35 volts. |
| Unijunction transistor 56 | TIS43. |
| Speaker 58 | 3.2 ohms. |
| Diode 60 | 1N626. |
| Resistors— | |
| 61 | 18K. |
| 62 | 3.9K. |
| Capacitor 64 | 20 microfarads, 50 volts. |

In another embodiment of the invention, a lamp and associated conventional amplification circuit are substituted for the speaker 58. In this manner, the current pulses will cause a lamp to flash in response to the receipt of reflected light by the photocell 30. The frequency of the light flashes will be proportional to the intensity of the light received by the photocell 30.

The operation of the apparatus is as follows. The arm of switch 20 is moved to engage contact 20b. The enlarger light is activated for adjustment purposes by engaging contact 28b. After focusing and other adjustments are made, contact 28a is reengaged. The desired lens aperture is set. The desired enlarging paper is then placed in the easel and the knob 18 is turned to a predetermined setting suitable for the enlarging paper being used. This setting may be marked on the knob. For example, the potentiometer 18′ may be set so that 12 clicks will always connote a correct, average exposure, although a highly sensitive (or a much less sensitive) enlarging paper is used. Since a highly sensitive paper will require less visible light to obtain a correct, average exposure, knob 18 is turned to bias transistor 44 accordingly.

After the enlarging paper is inserted in the easel 36, the pistol-shaped sensing device 14 is aimed at a selected region and the trigger 28 is pulled, thereby opening the circuit to the safelight and simultaneously closing the enlarger lamp circuit. The operator can now count 12 clicks in order to meter a correct exposure.

It can be seen that this system is extremely useful where dodging is required. For example, the operator may dodge for six clicks and allow exposure of the complete area of the paper for another 12 clicks. Or, a relatively normal density region of the negative image can be exposed for 12 clicks, and then covered while a dark region is exposed for six more clicks. By utilizing a lens 32 in front of the photocell 30, the device 14 can be directed at a very small area.

As used herein, the term "photo-sensitive paper" refers to any photo-sensitive material, whether or not the material is conventionally considered as "paper." Further, the term "photographic negative" includes photographic transparencies as well as items which are commonly called "negatives."

Although an illustrative embodiment has been shown and described, it is to be understood that various modifications and substitutions may be made by those skilled in the art without departing from the spirit and scope of the present invention.

What is claimed is:

1. A device for metering visible illumination intensity for allowing an operator to quantitatively determine the visible illumination intensity comprising means for connecting said device to a source of current; photo-sensitive means electrically coupled to said connecting means; speaker means for providing an audible signal; and means coupling said photo-sensitive means to said speaker means, said audible signal being dependent upon the rate at which visible light is received by said photo-sensitive means.

2. A device for metering illumination intensity as described in claim 1, wherein said coupling means includes means for providing current pulses to said speaker means with the pulse rate being proportional to the visible light intensity received by said photo-sensitive means, said current pulse providing means being biased by the potential across said photo-sensitive device to permit passage of current pulses to said speaker in frequency-proportion to said potential.

3. A device for timing an exposure of photo-sensitive paper to visible light during the enlarging of a photographic negative, comprising photo-sensitive means responsive to visible light reflected from a selected portion of said photo-sensitive paper; means electrically coupling said photo-sensitive means to a source of current; indicating means coupled to said photo-sensitive means; and means for providing current pulses to said indicating means proportional in frequency to the rate at which visible light is received by said photo-sensitive means, said pulse providing means including a capacitor having its charge responsive to the conductivity of said photo-sensitive means, and a unijunction transistor in series with said indicating means and a charge path for said capacitor.

4. A device for timing an exposure of photo-sensitive paper to visible light during the enlarging of a photographic negative as described in claim 3, said indicating means comprising a speaker for providing an audible signal, whereby the operator is enabled to time said exposure by counting the audible pulses emitted by said speaker.

5. A device for timing an exposure of photo-sensitive paper to visible light during the enlarging of a photographic negative as described in claim 3, including means for manually varying the voltage bias on said pulse providing means to compensate for variations in the light sensitivity of various photo-sensitive papers.

6. A device for timing an exposure of photo-sensitive paper to visibe light during the enlarging of a photographic negative as described in claim 3, said photo-sensitive means being positioned within a housing having a generally pistol shape, with a trigger for closing the circuit to connect said photo-sensitive means and said current pulse providing means to said current source.

7. A method for timing an exposure of photo-sensitive paper to visible light to allow the operator to quantitatively determine the visible illumination intensity during the enlarging of a photographic negative, comprising the steps of positioning a photo-sensitive device to receive visible light reflected from a selected portion of said photo-sensitive paper; providing audible pulses, the frequency of which is dependent upon the rate at which the visible light is received by said photosensitive device; and counting said audible pulses to determine the exposure timing.

8. A method for timing an exposure of photo-sensitive paper to visible light during the enlarging of a photographic negative as described in claim 7, including the step of adjusting the pulse rate to compensate for variations in the light sensitivity of various photo-sensitive papers.

9. A meter for indicating illumination intensity comprising photo-sensitive means for receiving visible light; electrical control circuit means responsive to said photo-sensitive means for producing current pulses at a rate proportional to the rate at which the light is received by said photo-sensitive means, said control circuit means including a capacitor having its charge responsive to the conductivity of said photo-sensitive means; output means responsive to said current pulses for translating each pulse into a utilization signal, and a unijunction transistor in series with said output means and a charge path for said capacitor.

10. A meter for indicating illumination intensity as described in claim 9, wherein said control circuit means produces current pulses at an audible rate and said output means comprises an electroacoustic transducer.

11. In a light exposure system which allows an operator to quantitatively determine the visible illumination intensity; means for projecting visible light upon an exposure position; photo-sensitive means; means for imaging on said photo-sensitive means the illumination on said exposure position; electrical control circuit means responsive to said photo-sensitive means for producing current signals in proportion to the rate at which the visible light is received by said photo-sensitive means; switching means for energizing all of said above mentioned means simultaneously; and output means responsive to said current signals for converting the same into audible signals.

12. In a light exposure system which allows an operator to quantitatively determine the visible illumination intensity: means for projecting visible light upon an exposure position; photo-sensitive means; means for imagaing on said photo-sensitive means the illumination on said exposure position; electrical control circuit means responsive to said photo-sensitive means for producing current signals in proportion to the rate at which the visible light is received by said photo-sensitive means; and output means responsive to said current signals for converting the same into usable indicating signals.

References Cited

UNITED STATES PATENTS

| 2,550,488 | 4/1951 | Marsh | 250—83.6 XR |
| 3,269,287 | 8/1966 | Ost | 355—68 X |
| 3,402,636 | 9/1968 | Gemmer | 355—68 |
| 3,458,262 | 7/1969 | Greenlee | 355—68 XR |

JOHN M. HORAN, Primary Examiner

R. L. MOSES, Assistant Examiner

U.S. Cl. X.R.

355—38, 83

UNITED STATES PATENT OFFICE
CERTIFICATE OF CORRECTION

Patent No. 3,544,214      Dated December 1, 1970

Inventor(s)     ALBERT D. EDGAR

It is certified that error appears in the above-identified patent and that said Letters Patent are hereby corrected as shown below:

Column 3, line 4 "and" should be -- an --.

The following parameters were not printed and should be inserted at line 68:

| | |
|---|---|
| -- Capacitor 65 | 4 microfarads, 150 volts |
| Diode 66 | 1N3756 |
| Resistor 68 | 120 ohms |
| Resistor 70 | 22 meg. ohms -- |

SIGNED AND
SEALED·
MAR 2 1971

(SEAL)
Attest:

Edward M. Fletcher, Jr.
Attesting Officer

WILLIAM E. SCHUYLER,
Commissioner of Pate